March 30, 1965  C. D. STEPHENS  3,175,321
SPIN ROD HANDLE
Filed Jan. 16, 1962
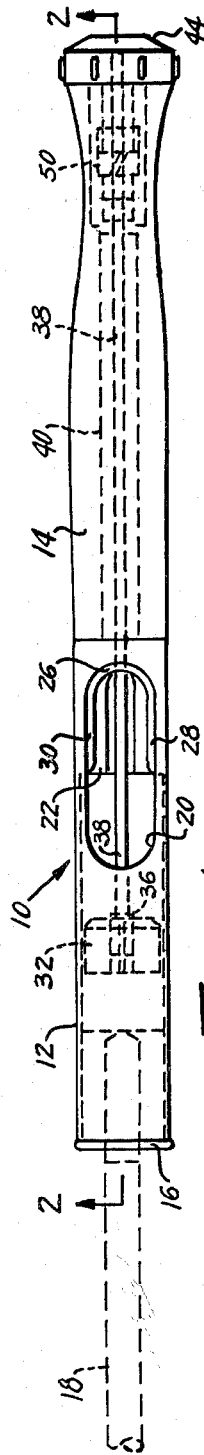
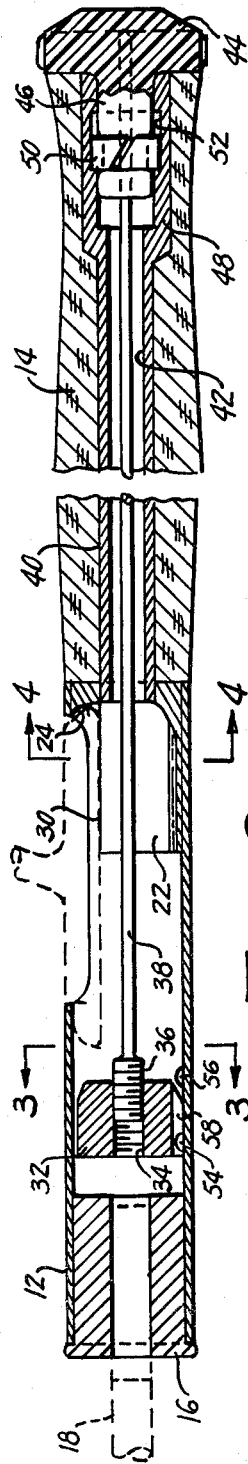
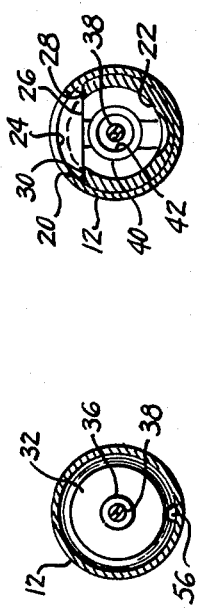
INVENTOR.
CHARLES D. STEPHENS
BY *Kimmel & Crowell*
ATTORNEYS.

3,175,321
SPIN ROD HANDLE
Charles D. Stephens, San Antonio, Tex., assignor to
Fredric P. Schwab, San Antonio, Tex.
Filed Jan. 16, 1962, Ser. No. 166,568
1 Claim. (Cl. 43—22)

This invention relates to a spin rod handle construction, and more specifically to a fishing rod handle construction forming part of a spin-type fishing rod.

Since the advent of spin fishing in the United States, many forms of spin fishing rod constructions have been developed. Particularly, development of fishing rods of this type has led to various arrangements for fixing the fishing reel to the handle of the rod. Most of the arrangements developed perform their function as intended, but due to the relationship between the rod handle and reel are awkward.

In spin fishing tackle the reel foot is normally fixed to the fishing rod handle so that the reel is suspended therefrom in spaced relation. A shank extends between the reel foot and the reel and the user grasps the rod handle with the fingers of his or her hand encircling the handle and the reel foot. The shank extending between the reel foot and the reel is usually disposed between the second and third fingers.

One common type of handle for spin fishing rods now in use comprises an elongated cylindrical cork body having a butt end and a forward end in which the rod is fixed. A pair of annular rings are loosely fitted on the handle and are the means used to fix the reel thereto. The reel foot is usually curved to conform to and seat against the handle. The loosely fitted rings are moved into encircling engagement with the reel foot on opposite sides of the shank extending therefrom and force the reel foot into tight engagement with the cork handle.

Another fairly common form of means used to fix a spinning reel to a rod handle is a construction wherein the handle includes a metal sleeve thereon intermediate the ends of the handle. A hood member is fixed to one end of the metal sleeve and is adapted to receive one end of the reel foot. The metal sleeve also includes a movable hood which is moved into engagement with the other end of the reel foot whereby the reel is fixed to the rod handle in the desired position.

In the first mentioned handle construction the reel, when first secured thereto, is in tight seating engagement. However, the cork handle beneath the metal rings tends to compress under the sustained pressure thereof and subsequently the reel can move out of its proper position.

The most apparent disadvantage of the second mentioned construction is the awkward grip afforded the user whose fingers must encircle the hoods, or a portion thereof, as well as the reel foot and rod handle.

One of the objects of the present invention is a novel fishing rod handle construction for spin fishing rods.

Another object of the invention is a novel fishing rod handle construction for spin fishing rod which provides improved means to fix a fishing reel thereto.

Another object of the invention is a novel fishing rod handle construction for spin fishing rods which will accommodate reels having foot portions of various dimensions.

Another object of the invention is a novel fishing rod handle construction for spin fishing rods wherein a portion of the foot of a reel is positioned within the handle.

Other objects and advantages of the invention will become apparent by referring to the following detailed description when taken with the accompanying drawings wherein:

FIGURE 1 is a top plan view of the fishing rod handle constructed in accordance with the teachings of the present invention.

FIGURE 2 is an enlarged longitudinal sectional view of the fishing rod handle of the present invention taken on lines 2—2 of FIGURE 1.

FIGURE 3 is a transverse sectional view taken on lines 3—3 of FIGURE 2.

FIGURE 4 is a transverse sectional view taken on lines 4—4 of FIGURE 2.

Referring now to the drawing in detail, the fishing rod handle 10 of the present invention comprises forward and rear sections 12 and 14, respectively.

The forward section 12 of the handle 10 is, as shown, in the form of a cylindrical tube. A plug 16 is fixed in the end of the forward section 12 and a fishing rod 18, shown in dotted lines, is secured in the plug 16. The forward section 12 further includes a cut-out portion 20 into which the foot of a fishing reel, shown in dotted lines in FIG. 2, is inserted. The end of the forward section 12, opposite the end in which the plug 16 is fixed, includes a sleeve portion or insert 22 of reduced diameter which extends a distance in forward section 12 approximately one-half the length of cut-out portion 20. One end of the cut-out portion 20 is undercut as shown by reference number 24 and provides a shoulder 26 contiguous with oppositely disposed shoulders 28 and 30 formed on the reduced diameter portion 22. The shoulders 26, 28, and 30 provide a substantially U-shaped supporting surface for one end of the reel foot. The other end of the reel foot is positioned to engage the interior of the forward section 12 adjacent the cut-out portion 20 as shown in FIGURE 2. The reel is retained in position by a reel lock 32 somewhat similar to the reel lock disclosed in my co-pending U.S. application Serial No. 853,724, filed November 18, 1959, now Patent No. 3,047,974.

However, in the embodiment shown in the present invention the structure has been modified to suit the particular application.

The reel lock 32 includes a threaded bore 34 therein into which extends the threaded end 36 of a rotatable rod 38. The rotatable rod 38 extends through a sleeve 40 positioned in a longitudinal bore 42 in the rear section 14 of the fishing rod handle 10. An operating knob 44 is fixed on the end of the rod 38 and has a portion thereof in abutting relation to the end of the rear section 14. The knob 44 is provided with a centrally disposed projecting portion 46 which extends into a enlarged portion 48 of sleeve 40. A circumferential recess (not shown) in the projecting portion 46 of knob 44 receives a split ring 50 which resides in a circumferential groove 52 in the enlarged portion 48 of sleeve 40 to retain the knob 44 and the rod 38 in position. It will be apparent that rotation of operating knob 44 rotates rod 38, and the threaded end 36 thereof engaging the threads in the bore 34 of reel lock 32 causes the same to be moved into engagement with the reel foot to secure the reel in position in the fishing rod handle 10. Rotation of the reel lock 32 is prevented by a pair of spaced pins 54 and 56 in the forward section 12 which extend into a channel 58 in the reel lock 32.

It will further be apparent that when the reel is secured in position on the handle 10 the foot portion of the reel substantially fills the cut-out portion 20 of the forward section 16 so that the hand and fingers of a person using the apparatus can comfortably grip the handle 10.

While the present invention has been described in its preferred embodiment, modifications and variations thereof will become apparent to those skilled in the art. However, such modifications and variations are considered to be within the scope of the appended claim.

I claim:

A fishing rod handle comprising a cylindrical tube having portions defining an elongated top opening therein, a plug member secured in one end of said tube, a fishing rod secured in said plug member, said portions defining said top opening being dimensioned to accommodate the foot of a spin fishing reel and having an overhang portion at the end of the opening adjacent said plug member adapted to overlie one end of the foot, a sleeve insert within the other end of said tube having top shoulders adjacent and below the periphery of the other end on said opening and portions defining an undercut end, the other end of said reel foot being adapted to engage beneath said undercut end and seat on said shoulders; a linearly movable generally cylindrical locking member in said tube between said plug and the adjacent end of said opening, said locking member having a circular beveled portion on the end adjacent said top opening, portions of said locking member defining a threaded central bore, and other portions thereof defining a longitudinal groove on the side thereof opposite said top opening, pins on the interior of said tube engageable with said other portions defining said groove to preclude rotation of said locking member, a rod extending longitudinally of said tube, an enlarged threaded end portion on said rod engageable in said threaded bore, a handle grip secured to the end of said tube opposite said plug, a sleeve extending through said handle grip, said rod extending through said sleeve, and an operating knob secured to said rod at the end of said handle grip, whereby rotation of said operating knob in one direction moves said locking member linearly of said tube in a manner adapted to engage the same with the end of the reel foot beneath said overhung portion.

References Cited by the Examiner
UNITED STATES PATENTS

| | | | |
|---|---|---|---|
| 1,159,466 | 11/15 | Bristow | 43—22 |
| 2,554,787 | 5/51 | McGuire | 43—22 |
| 2,646,640 | 7/53 | George | 43—23 X |
| 2,667,713 | 2/54 | Stephens | 43—22 |
| 2,782,547 | 2/57 | McMullin | 43—22 |
| 2,793,458 | 5/57 | Stephens | 43—22 |
| 2,855,718 | 10/58 | Stephens | 43—22 |
| 3,006,098 | 10/61 | Harke | 43—22 |
| 3,047,974 | 8/62 | Stephens | 43—22 |

ABRAHAM G. STONE, *Primary Examiner.*